United States Patent [19]

Baker

[11] Patent Number: 5,203,093

[45] Date of Patent: Apr. 20, 1993

[54] PLUG-IN HUB RING

[75] Inventor: Gerald N. Baker, Florissant, Mo.

[73] Assignee: Emerson Electric Co., St. Louis, Mo.

[21] Appl. No.: 699,258

[22] Filed: May 13, 1991

[51] Int. Cl.⁵ .............................................. F26B 11/02
[52] U.S. Cl. .................................. 34/133 F; 34/133 J;
416/174; 416/204 R
[58] Field of Search ............. 34/133 F, 133 G, 133 H,
34/133 J; 416/146 A, 174, 204 R

[56] References Cited
U.S. PATENT DOCUMENTS 4,407,078 10/1983 Takeyama et al. ............... 34/133 F Primary Examiner—Henry A. Bennet
Attorney, Agent, or Firm—Polster, Lieder, Woodruff & Lucchesi

[57] ABSTRACT

A household appliance (D) has a housing (H). A fan (A) located inside the housing circulates air through the appliance. The fan is attached to a motor (M) located outside the housing. The motor has a shaft (S) extending through an opening (O) in a sidewall (W) of the housing and the fan is connected to the inner end of the shaft. A hub ring (9) is used for mounting the motor to the housing and includes a flange (13) having tabs (17) which engage a hub U of the motor to interlock the motor/fan assembly with the hub ring. The housing has a projection (3) on the outside of the housing through which the shaft extends and the hub ring has a sleeve 11 received in the projection to align and support the motor/fan assembly.

15 Claims, 2 Drawing Sheets

PLUG-IN HUB RING

BACKGROUND OF THE INVENTION

This invention relates to household appliances and more particularly, to a plug-in hub ring for use in mounting an electric motor in a clothes dryer, for example.

In conventional clothes dryers of the type used in households, hot air is blown over the clothes placed in a housing or drum to dry them. A blower motor installed in the dryer has a shaft extending through a wall of the housing and a fan on the inner end of the shaft circulates the hot air about. The motor, in turn, is supported on a bracket external to the housing and an elastometric or rubber mounting ring is typically used with the motor to obtain proper alignment of the motor and to dampen vibrations. In addition, a lint seal is employed to prevent lint from migrating through the opening in the side of the housing, getting into the motor's bearings, and damaging the motor.

A variety of clamping arrangements have been used with dryer motors to affix the mounting ring on the end of the motor. An example of such an arrangement is shown, for example, in U.S. Pat. No. 3,464,656 which is assigned to the assignee of the present application. The base in which the ring fits is usually a sheet metal base or plate. Once the motor is installed, a clamp is fitted over the ring to clamp the motor in place while retaining rotational and axial motion in the base. Such arrangements have a certain drawbacks. First, a number of parts are required. Second, the assembly procedure is cumbersome. Third, lint sealing and vibration dampening are not wholly satisfactory. It would be advantageous, for example, if the clamping system could be simplified or done away with. This would not only reduce the number of parts required, but also reduce assembly time and lower costs. Also, lint protection and vibration dampening could be improved.

SUMMARY OF THE INVENTION

Among the several objects of the present invention may be noted the provision of a plug-in hub ring for use in a household appliance such as a clothes dryer; the provision of such a ring for use in installing a motor such as a blower motor in the dryer; the provision of such a hub ring to be easily installable, to simplify installation of the motor in the dryer, and to properly align the motor; the provision of such a ring to improve dampening of motor vibrations and lint sealing; the provision of such a ring to eliminate the need for clamps or other motor installation systems; and, the provision of such a ring which is a low-cost, replaceable item.

Briefly, the present invention is directed to a household appliance such as a clothes dryer in which clothes are placed. A fan located inside a housing defining a tub in which the clothes are placed, circulates heated air about the inside of the housing to dry the clothes. A motor for driving the fan includes a shaft extending through an opening in a sidewall of the housing. The fan is attached to the outer end of the shaft. A hub ring is insertable in a receptacle formed in the sidewall adjacent the opening and the motor hub fits in the ring. The ring has a sleeve extending through the sidewall. The motor shaft fits into the sleeve which serves to align the motor. Use of the ring eliminates the need for clamps or other installation devices. Other objects and features will be in part apparent and in part pointed out hereinafter.

BRIEF DESCRIPTION OF THE DRAWINGS

Corresponding reference characters represent corresponding parts throughout the several views of the drawings.

DESCRIPTION OF THE PREFERRED EMBODIMENT

Figure 1:
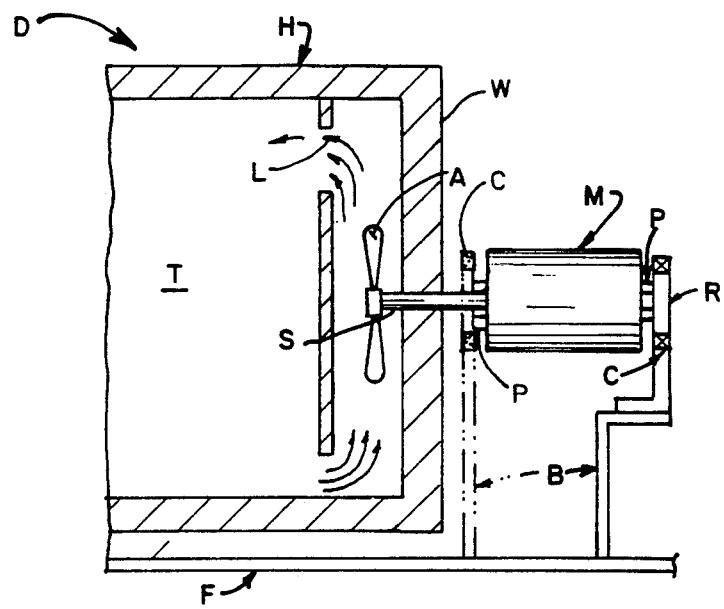
FIG. 1 is a partial sectional view of a clothes dryer motor illustrating a prior art method of motor installation.

Referring to the drawings, and in particular FIG. 1, (labeled prior art), a household appliance such as a clothes dryer D has a frame F. A housing H installed in the frame defines a tub T in which clothes are placed for drying. Clothes to be dried are loaded into the appliance and when it is turned on, heated air from a source (not shown) is blown over the clothes to dry them. The clothes may be tumbled during this drying operation so all portions of all the clothes are exposed to the heated air. Circulation of air is accomplished by a blower fan A positioned inside the housing. The fan is mounted on the end of a shaft S which extends through a sidewall W of the housing.

Typically in the prior art, the motor is mounted on a pair of brackets B (one shown in phantom) individually ones of which are connected to the frame. As shown in FIG. 1, brackets B extend upwardly from a base portion of frame F. Motor M is positioned horizontally and vertically to permit the motor shaft to project through the sidewall of the housing. The motor has rearward & forward projections P around which fits a hub ring R. A clamp C is supported by brackets B and clamps about ring R to attach the motor to the brackets. One of the brackets B is shown in dashed lines in FIG. 1 to indicate that it is eliminated with the present invention.

Figure 1A:
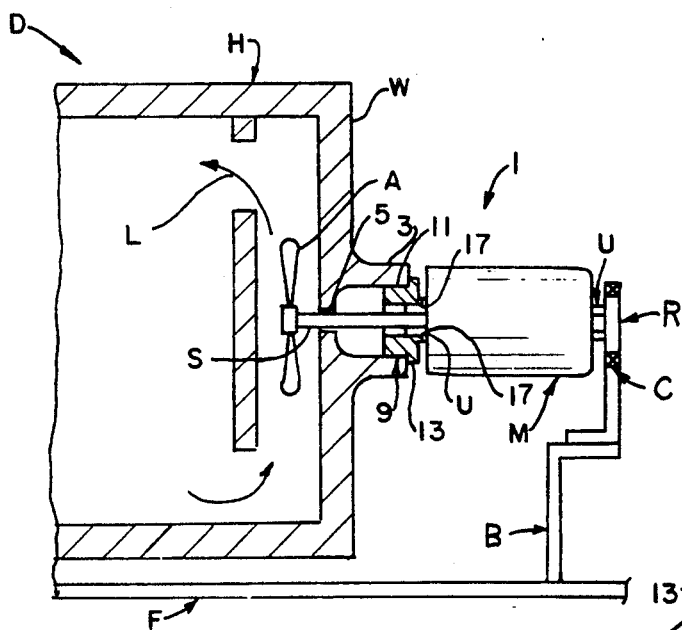
FIG. 1a is a partial elevational view of a housing in which a hub ring of the present invention is received.
Figure 2:
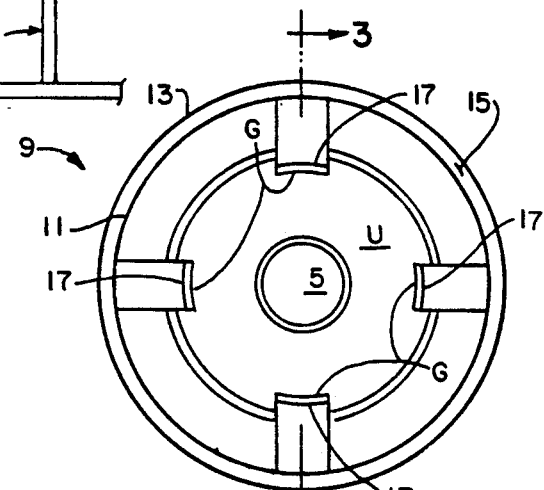
FIG. 2 is an elevational view of the hub ring.
Figure 3:
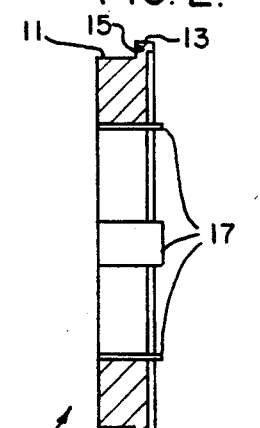
FIG. 3 is a sectional view taken along line 3—3 in FIG. 2.

Referring now to FIG. 1A, like parts being similarly labled where appropriate, a means of the present invention for mounting the motor to the housing is indicated generally by the reference numeral. As shown, sidewall W has a hollow, cylindrical projection 3 extending from the outer face of the sidewall. A concentric bore 5 extends through the sidewall. The diameter of the bore permits passage of shaft S. Means 1 includes a hub ring 9 sized to fit or plug into projection 3. The hub ring 9 includes a hollow, cylindrical sleeve 11 having an outer diameter corresponding to the inner diameter of the projection 3. The hub ring 9 further includes an integrally formed annular flange 13 at the outer end of sleeve 11. When set into the projection, an inner face 15 (FIG. 3) of the flange 13 abuts the outer face of projection 3. The hub ring further includes a plurality (4) of tabs 17 which extend rearwardly of flange 13 (see FIG. 3). The tabs are equidistantly spaced about the hub ring and fit into correspondingly sized slots or openings G in the side of motor hub U in the embodiment shown. Other spacing may be used, if desired.

Hub ring 9 performs a number of functions. First, the hub ring axially aligns the motor with the projection. Second, the tabs act to lock the motor in place so to maintain the alignment as well as keep the motor from twisting. Also, the design of the hub ring may act as a lint seal which keeps lint from migrating along the shaft and damaging the motor. Third, the hub ring eliminates the need for clamps such as the clamp shown in FIG. 1. Fourth, the hub ring, which is a molded component formed of an elastometric material, acts to dampen vibrations which are otherwise transmitted to the motor/shaft assembly.

Figure 4:
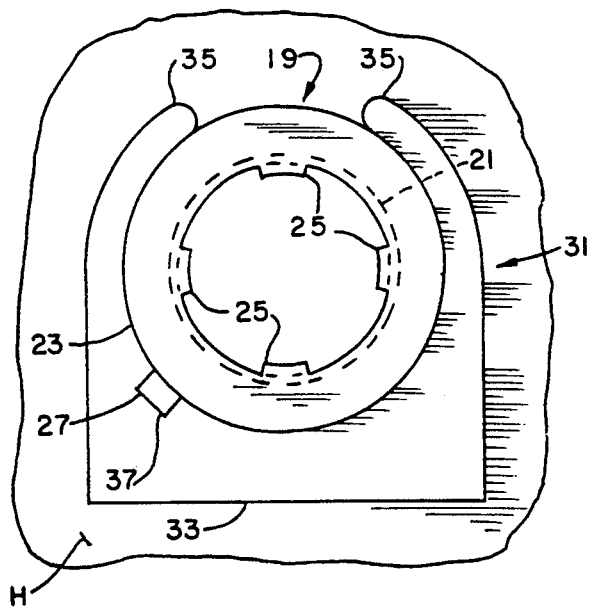
FIG. 4 is an installed elevational view of a second embodiment of the hub ring.

Referring to FIG. 4, a hub ring 19 comprising a second embodiment of the invention is shown. The hub ring 19 has a sleeve 21 with an integrally formed flange 23 at the outer end thereof. A plurality of locking tabs 25 are equidistantly spaced about the ring and extend rearwardly. Again, other designs are compatible with the broader concepts of my invention. As before, the tabs 25 are used to key the hub ring onto hub U of the motor for alignment purposes and to prevent the motor from turning. Flange 23 also has a lug 27 extending radially outwardly from the side of the flange to key the hub ring into a sidewall projection 31. Projection 31 has a lower cradle portion 33 and opposed upwardly curving fingers 35. The fingers 35 curve around the sides of hub ring 19 and substantially encompass it. There is a spacing between the upper ends of the fingers and the fingers are sufficiently pliable for the hub ring 19 to snap-fit into place between them. A notch or keyway 37 is formed in the bottom, inner wall of the cradle 33. The size and location of the keway 37 allows lug 27 to fit into the keway and lock the hub ring 19 in place. As a result, the motor hub is not only securely locked onto the hub ring, but the hub ring is also secured to the projection. This further helps prevent unintended movement of the motor during operation.

Figure 5:
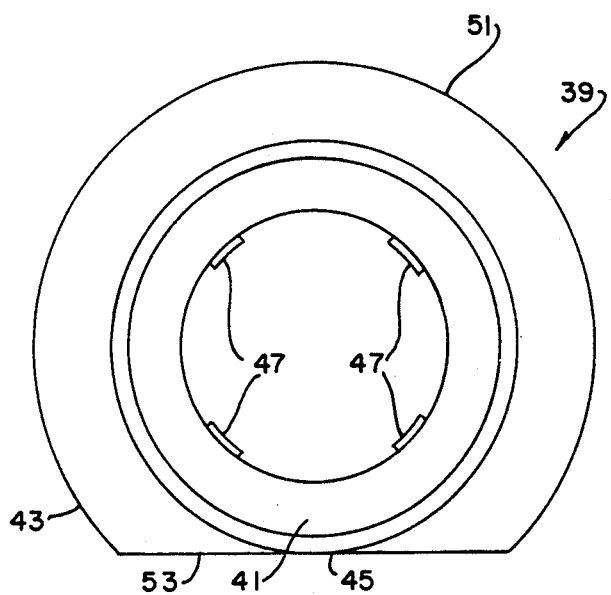
FIG. 5 is an end view of a second illustrative embodiment of hub ring of this invention; and, FIG. 6 is an installed view, partly in section and partly broken away of the embodiment of the hub ring shown in FIG. 5.
Figure 6:
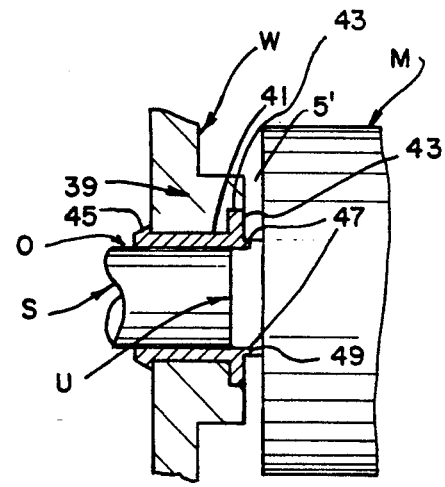

Referring to FIGS. 5 and 6, a third embodiment of the hub ring of the present invention is indicated generally 39. Hub ring 39 includes an integrally formed sleeve 41 and a flange 43. In this embodiment motor M again has its shaft S extending therefrom through projector 3. The housing H again includes the sidewall W from which projection 3 extends. Projection 3 has an opening O formed in it. The shaft 3 extends into the projection and through the opening O. The diameter of the opening O is slightly larger than the diameter of the shaft S. Sleeve 41 has an inner diameter, permiting its insertion over the diameter of shaft S, and an outer diameter, permiting its placement within the diameter of opening O. The length of the sleeve 41 is sufficient for the inner end of the sleeve to extend into the interior of the housing H. The sleeve 41 has a circumferential lip 45 at this inner end, the lip extending radially outwardly from the end of the sleeve 41. When sleeve 41 and shaft S are inserted through the opening O, the lip 45 catches against the inner wall of the housing H to lock the hub ring 39 in place. A plurality of tabs 47 extend outwardly from flange 43 and engage openings or slots in hub U of the motor M to key the hub ring 39 onto the motor M. Again, while four such lugs are shown, it will be understood there could be more or fewer. A recess 49 is formed in the outer face of projection 3 and extends about the circumference of the face of the projection. The depth of the recess 49 corresponds to the thickness of flange 43 and the shape of the recess conforms to that of the flange. As seen in FIG. 5, flange 43 has a generally circular arcuate segment 51 comprising the major portion of the flange. However, the flange also has a flattened or shallow segment 53. The recess has corresponding circular and flattened segments. The flattened portion of the flange and recess serve to lock the hub ring in place and prevent its movement in the same way as the locking lug and keyway previously described. Other embodiments may eliminate the need for the flattened portion. Those skilled in the art also will recognize that the flange 43 maybe internal or external of the housing.

It will be understood that while the hub rings shown in the various embodiments of the invention serve to align the motor and shaft. A similar hub ring design also can also be used at the opposite end of the motor in place of the clamp C. By using snap-in or plug-in type hub rings of the types described above, the number of parts required for attaching the motor and appliance to one another is reduced, and installation and alignment of the motor is simplified. A conventional lint seal may be employed with the constructions described, if desired. Likewise, various designed interconnecting lugs formed in the hub and housing may be interchanged with one another in other embodiments of this invention. Such variations are merely illustrative.

Having thus described the invention, what is claimed and desired to be secured by Letters Patent is:

1. In a household appliance having a housing in which a fan is located for circulating air through the housing, a motor located outside the housing for driving the fan and having a shaft to which the fan is attached extending through an opening in a sidewall of the housing the improvement which comprises means for mounting the motor to the housing, said means including a motor hub ring attachable to the housing sidewall adjacent the opening, and means formed on the ring for interlocking the motor with the hub ring, the housing including a projection extending outwardly of the housing, said projection having an axial groove in it, and said hub ring being received in said projection, and said hub ring including an annular flange fitting over the outer face of the projection.

2. The improvement of claim 1 wherein the motor has a central hub with openings therein and the hub ring has tabs which interlock the hub ring with the hub by fitting into the openings.

3. The improvement of claim 2 wherein the hub ring further includes a sleeve extending into the projection and fitting about the motor shaft to align the motor/fan assembly.

4. The improvement of claim 3 wherein the appliance is a clothes dryer and the sleeve forms a seal about the shaft to prevent migration of lint therealong.

5. The improvement of claim 3 wherein the projection comprises a cradle having integrally formed fingers extending circumferentially about the ring along opposite sides thereof to hold the hub ring.

6. The improvement of claim 5 further including locking means to prevent displacement or rotational movement of the motor caused by vibrations.

7. The improvement of claim 6 wherein the locking means includes a lug formed on the outer face of the flange and the projection has a corresponding notch in which the lug fits.

8. The improvement of claim 6 wherein a portion of the flange perimeter is flattened and the projection has a corresponding recessed area in which the flattened portion of the flange fits to lock the ring in place and prevent motor rotation.

9. The improvement of claim 3 wherein the flange and sleeve are integrally formed with one another.

10. The improvement of claim 3 further including a lip formed on the end of the sleeve insertable in the projection, the lip engaging the inner sidewall of the housing to hold the ring in place.

11. In a clothes dryer having a housing, a fan located inside the housing for circulating air to dry clothes placed in the dryer, a motor located outside the housing for driving the fan and including a motor shaft extending through an opening in a sidewall of the housing for the fan to be attached to the end of the shaft, the improvement comprising a ring attachable to the sidewall adjacent the opening for mounting the motor to the housing and aligning the motor/fan assembly therewith, the motor having a central hub about the shaft with at least one opening therein, and the ring having a flange abutting the sidewall of the housing and a tab fitting into the opening in the hub to interlock the motor and the ring, and a sleeve fitting into the opening and about the shaft to align the motor/fan assembly with the opening.

12. The improvement of claim 11 further including locking means to prevent displacement of the ring and rotational movement of the motor due to vibrations, said locking means including a lug formed on the ring and the receptacle means including a corresponding notch in which the lug fits.

13. The improvement of claim 12 wherein housing has a projection extending outwardly from its sidewall and the ring is sized for the sleeve to fit into the projection.

14. The improvement of claim 11 wherein the flange sleeve and tabs are integrally formed.

15. The improvement of claim 11 wherein the ring is formed from an elastomeric material, further including an outer ring constructed from a second material, the tab being formed from the second material.

* * * * *